June 30, 1970  D. L. BOWERS ET AL  3,517,663

THRESHOLD ANALYZER FOR AN IMPLANTED HEART STIMULATOR

Filed April 15, 1968  3 Sheets-Sheet 1

Inventors
David L. Bowers
David C. Fischer
By Ralph D. Hohenfeldt
Attorney

June 30, 1970  D. L. BOWERS ET AL  3,517,663
THRESHOLD ANALYZER FOR AN IMPLANTED HEART STIMULATOR
Filed April 15, 1968                            3 Sheets-Sheet 2
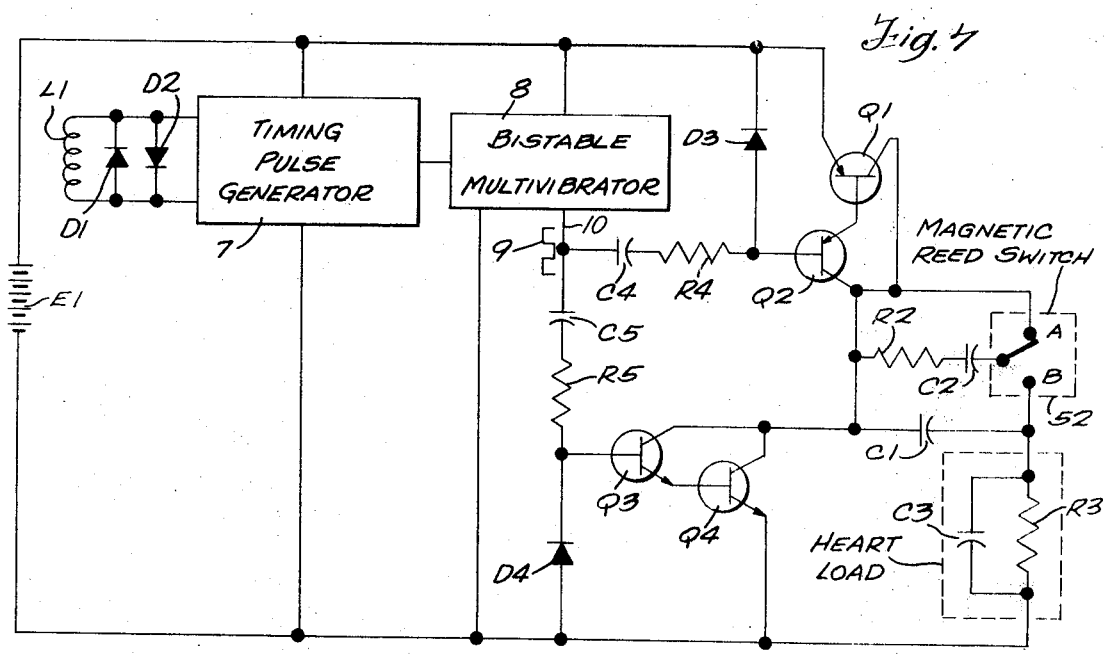
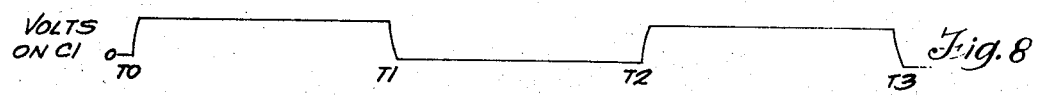
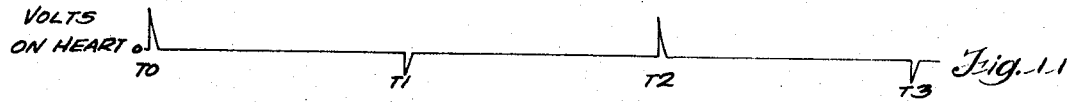
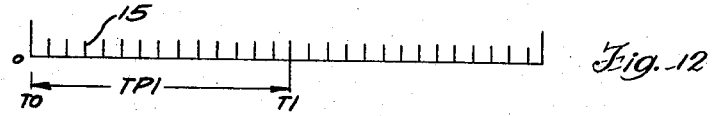
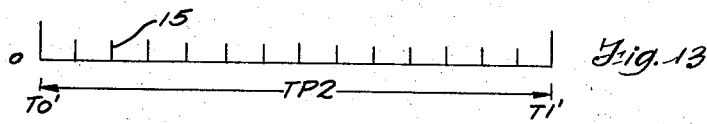
Inventors
David L. Bowers
David C. Fischer
By Ralph D. Hohenfeldt
Attorney June 30, 1970   D. L. BOWERS ET AL   3,517,663
THRESHOLD ANALYZER FOR AN IMPLANTED HEART STIMULATOR
Filed April 15, 1968   3 Sheets-Sheet 3
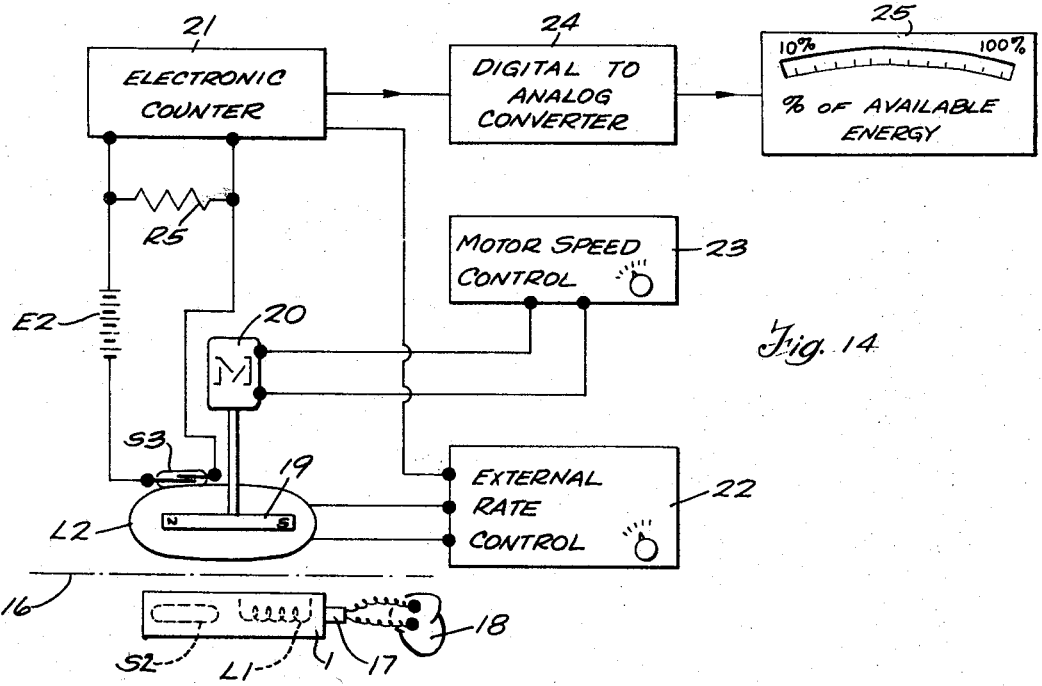
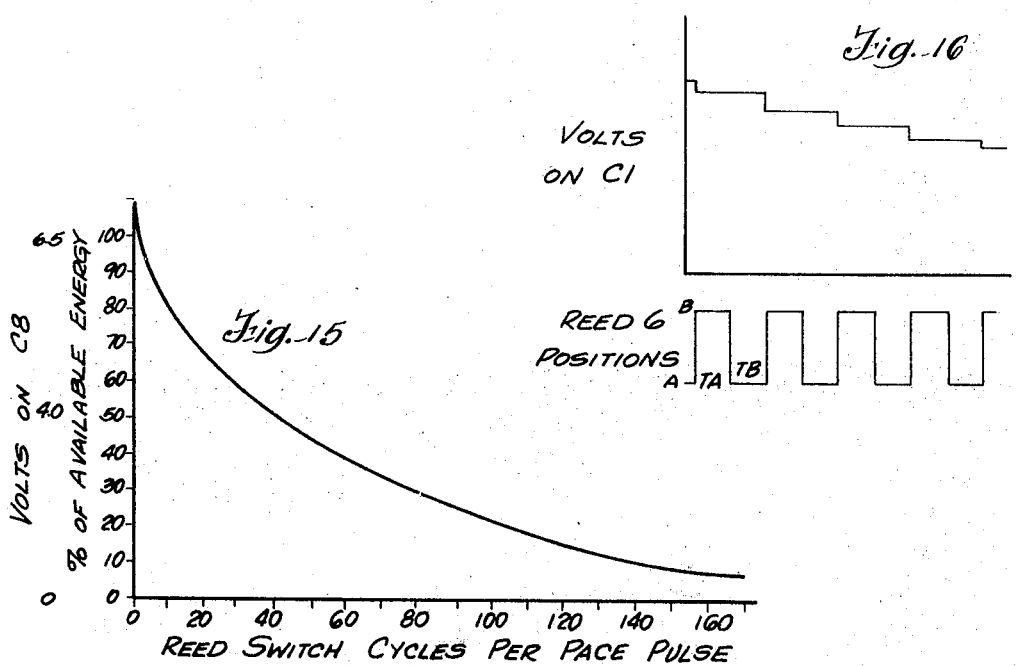
Inventors
David L. Bowers
David C. Fischer
By
Ralph D. Hohenfeldt
Attorney United States Patent Office 3,517,663
Patented June 30, 1970

3,517,663
THRESHOLD ANALYZER FOR AN IMPLANTED
HEART STIMULATOR
David L. Bowers, Wauwatosa, and David C. Fisher,
Brookfield, Wis., assignors to General Electric
Company, a corporation of New York
Filed Apr. 15, 1968, Ser. No. 721,492
Int. Cl. A61n 1/36
U.S. Cl. 128—2.06                                    7 Claims

ABSTRACT OF THE DISCLOSURE

An implanted electric heart stimulator has a coupling capacitor in series with the heart load. Electronic switches charge and discharge the capacitor over a short interval in which case current flow and energy from the capacitor are high enough to stimulate the heart. Heart threshold is defined as the point where just enough energy is delivered to the heart to produce or inhibit ventricular contraction. The output energy form the stimulator is decreased by transferring available stimulating energy or charge from the coupling capacitor to a small parallel capacitor and discharging the latter. A magnetic reed switch, operated with an external pulse magnetic field, controls the charging and discharging of the small capacitor. By increasing the magnetic pulse frequency, the coupling capacitor energy is reduced to a level where it is just insufficient to stimulate in which case the heart is allowed to miss a few beats indicating that threshold has been reached. Means are provided for displaying threshold energy as a percentage of energy that is available from the stimulator.

BACKGROUND OF THE INVENTION

This invention relates to an improved analyzer for assessing from outside the living body the operating condition of an electric heart stimulator system which includes the stimulus generator, the connecting leads, the electrode attachment and the threshold energy of stimulation.

When a heart stimulator is first implanted, its batteries are fully charged and the voltage, current and energy levels of the stimulating pulses exceed the minimum level required for stimulation. Eventually, the batteries deplete and physiological changes may occur so that the pulse energy tends toward falling below the stimulation threshold of the heart. When external stimuli are not sufficiently energetic, the heart usually reverts to a low idioventricular rate which may be twenty-five to thirty-five beats per minute in patients suffering from heart block. The patient must then be sustained by drug therapy or an external pacing system until the stimulator power supply is replaced or until other indicated corrective measures are taken.

On a previous occasion, one of the present inventors perceived the desirability of ascertaining the reserve power in an implanted stimulator without invading the body. A device for accomplishing this purpose was marketed and is a subject of Pat. No. 3,426,748. The device comprises a pulse generator which supplies relatively high frequency pulses at a high repetition rate to an electromagnetic coil. The coil is placed on the body over the implanted stimulator and takes control of its basic pace pulse rate. A series of pulses are then injected at a high repetition rate, as high as three thousand per minute, and the amount of energy that is available to stimulate the heart is correspondingly decreased. As more high rate pulses are injected between pace pulses, stimulation energy is gradually reduced to just below the threshold of the heart. This is manifested by the heart being allowed to miss a few beats as evidenced on an electrocardiograph which is taken concurrently. The analyzer is calibrated for reading threshold or minimum energy for stimulation as a percentage of energy that is available from the implanted stimulator.

The earlier type of threshold analyzer discussed above induced relatively high repetition rate pulses of low energy for varying the energy on a coupling capacitor which connected the stimulator to the heart. These small pulses also circulated through the heart during threshold analysis. Immediately after electrode implant surgery, the heart is irritable, sensitive and responsive to very low energy stimuli. In this condition, the heart tries to beat at an elevated rate which is some subdivision of the high rate of the induced pulses. Therefore, threshold analysis could not be conducted for a period of at least five to seven days until the heart returned to a relatively normal and stable threshold, nonresponsive to the high rate pulses. In many cases, however, it is desirable to know immediately after surgery the margin of safety between the stimulus that is required to stimulate the heart and the stimulus energy that is available from the stimulator. The present invention permits making a threshold analysis at any time.

SUMMARY OF THE INVENTION

The new threshold analyzer may be used with practically any cardiac stimulator that connects the stimulus pulse generator to the heart through a coupling capacitor. In one class of stimulators, a battery charges the coupling capacitor slowly through a high resistance in a series circuit that includes the heart. Current flow during the long time constant charging cycle is insufficient to stimulate the heart. The capacitor is then discharged periodically through a transistor switch over a short interval and the discharge current is sufficient to impart a stimulus to the heart which causes it to beat. A timing circuit renders the transistor switch nonconductive during the charging cycle and causes it to become conductive at a rate which corresponds with the desired beating rate of the heart which is usually set at seventy beats per minute.

Another type of stimulator with which the new threshold analyzer may be used is one in which a timing circuit renders a transistor switch conductive for an instant to charge the coupling capacitor rapidly through a low impedance to stimulate the heart and in which another transistor switch is closed and opened immediately to discharge the capacitor and apply the next stimulating pulse to the heart. The two transistor switches close and open alternately to keep the heart beating at its desired basic rate. Because the charge and discharge currents are both of short duration and high magnitude, the heart is stimulated during both cycles with alternately positive and negative pulses and the net current flow through the heart is essentially zero.

Either of the stimulator types discussed above may be adapted for use with a new threshold analyzer. This is done by connecting a small capacitor in parallel with the larger coupling capacitor through an electronic or mechanical switch which in the illustrative embodiment is a single pole, double-throw magnetic reed switch. During threshold analysis, the reed switch is vibrated by an electromagnetic field induced from an external magnet or electromagnet and small increments of charge are transferred from the coupling capacitor to the small capacitor with each complete vibration. The vibrating reed switch connects the small capacitor in a discharge circuit during the part of the vibration cycle during which the small capacitor is not accepting charge from the coupling capacitor. Since increments of charge are removed from the coupling capacitor, it does not have full charge when the coupling capacitor is discharged into the heart. By increasing the frequency of the reed switch, a voltage or charge level on the coupling capacitor can be attained which is insufficient to stimulate the heart. When this occurs, heart threshold has been reached. The pulses from the external magnetic pulse generator, which correspond in rate with the vibration rate of the reed switch in the stimulator, are counted and converted to an analog voltage which is representative of the percentage of available energy from the stimulator that is necessary to stimulate the heart. This allows a relative value in heart threshold energy to be read directly by the operator from outside the body without direct contact with the implanted stimulator system. It is interesting to note that in the type of stimulator that delivers alternate positive and negative pulses to the heart, that energy reduction only takes place for the negative pulses allowing the positive pulses to always deliver full energy. Hence, when threshold is reached during analysis, instead of the heart missing a continuous series of a few beats, it only misses the alternate beats of one polarity. The heart will always beat at at least one-half normal pacing rate during threshold analysis.

It will be seen that the small increments of charge which are transferred from the coupling capacitor to the small capacitor occur in a circuit that is isolated from the heart load so that pulses accompanying charge transfer are not reflected in the heart load. Thus, the heart has no tendency to follow the vibrational frequency of the reed switch nor will the threshold reading be adversely affected by any of the high rate signals.

In view of the foregoing discussion, it is apparent that a primary object of this invention is to provide an analyzer for assessing the operating condition of an implanted stimulator and for determining the threshold energy of stimulation of the heart.

A further object is to provide a threshold analyzer which can be used with a wide variety of existing stimulators without the need for extensive redesign.

Still another object of the invention is to enable adapting present stimulator designs for threshold analysis by incorporating a few simple components in the stimulator which, if they fail, will fail-safe and without any adverse effect on the operation of the stimulator or on the patient.

Another object of this invention is to provide a threshold analyzer that can be used safely on a stimulator that has been implanted recently and that minimizes the number of heart beats that must be missed in order to determine threshold.

How the foregoing and other more specific objects are achieved will appear in the course of the ensuing specification which describes a preferred embodiment of the invention in reference to the drawings.

DESCRIPTION OF THE DRAWINGS

FIG. 7 is a schematic diagram of another type of stimulator that is adapted for cooperation with the new threshold analyzer;

FIGS. 8–13 are graphs used in connection with describing the circuit of FIG. 7;

FIG. 14 is a schematic diagram of the new threshold analyzer system in conjunction with a stimulator that is implanted in a body;

FIG. 15 is a graph showing the relationship between the percentage of energy available for stimulating the heart versus the vibrational frequency characteristic of the reed switch in a stimulator; and, FIG. 16 is an enlarged graph showing the step-like reduction of stimulating pulse voltage occurring between pacing pulses during threshold analysis.

DESCRIPTION OF THE PREFERRED EMBODIMENT

Figure 1:
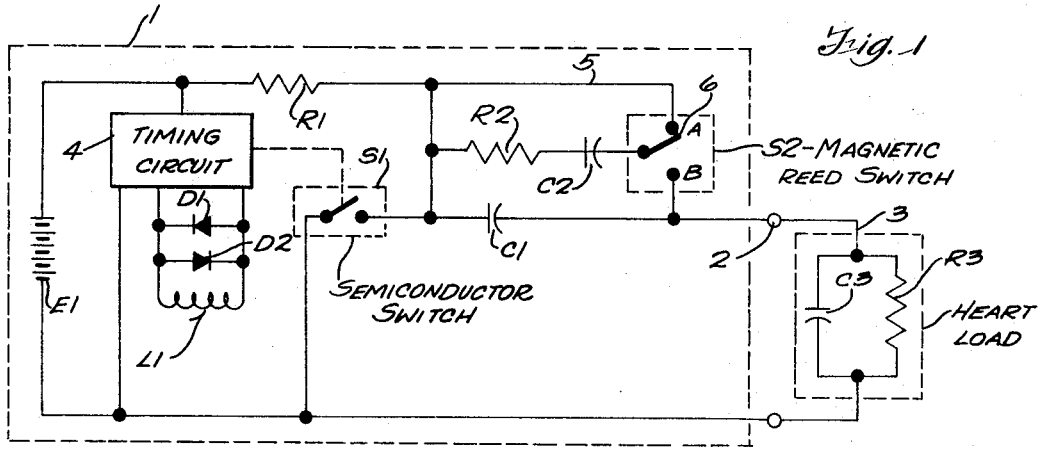
FIG. 1 is a schematic diagram of one type of implantable stimulator with which the new threshold analyzer may be used.

In FIG. 1, the components that are enclosed within the dashed line rectangle 1 are usually encapsulated in resin that is coated with a thin layer of body compatible material and implanted as an entity in the body at a site that is remote from the heart. The heart load is simulated by a small capacitance C3 in parallel with a resistor R3 which in most patients has a value of about 300 ohms. The stimulator has output terminal connectors 2 for connecting it to the heart load by means of flexible insulated conductors 3.

The stimulator includes a battery E1 which may have a terminal voltage of eight volts when new. Any suitable form of low power consumption timing circuit 4 may be supplied by the battery. The timing circuit produces output signals that are equal to or some multiple of the repetition rate of the stimuli that are applied to the heart. In this particular example, the timing circuit output signals are equal to the desired basic pacing rate of the heart.

The timing circuit 4 is adapted to operate a semiconductor switch S1 which is schematized as an ordinary switch but which may take many forms that are familiar to those versed in the electronic arts.

The stimulator includes a coupling capacitor C1 which may typically have a capacity of 3.3 microfarads. With switch S1 nonconductive during the interpulse period, capacitor C1 charges from battery E1 through a high resistance R1 and the heart load. The value of R1 must be much greater than the 300 ohm resistance value R3 of the heart. Capacitor C1 charges slowly in which case current flow through the heart and the stimulating energy applied to the heart is far below heart threshold.

After sufficient time elapses for capacitor C1 to charge, timing circuit 4 renders semiconductor switch S1 conductive in which case capacitor C1 discharges very rapidly through the heart load. Switch S1 becomes nonconductive in about four milliseconds although only about two milliseconds are utilized for effecting stimulation of the heart. After this short interval, switch S1 is nonconductive and capacitor C1 begins to recharge slowly through resistor R1 between pacing pulses.

Figure 2:
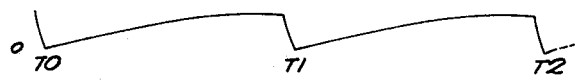
FIGS. 2–6 are graphs which facilitate explaining operation of the device in FIG. 1.

FIG. 2 shows the relationship between voltage on capacitor C1 and time during normal stimulator operation. T0 corresponds with the instant following closure and reopening of switch S1. At T0, the voltage on C1 is essentially zero. The capacitor C1 then charges slowly until time T1 when switch S1 closes for an instant to discharge the capacitor to its original low voltage level as shown. This process is repeated from T1 to T2 and so on, causing the heart to beat with its desired rhythm during S1 closure.

Figure 3:
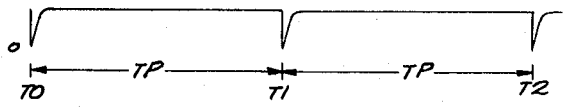

FIG. 3 shows that when capacitor C1 discharges, negative pulses are applied to the heart in this particular design, and that the time between pulses is designated by TP which is the basic pacing time.

To adapt the stimulator shown in FIG. 1 for use in the new threshold analyzing system, the stimulator is provided with a magnetic reed switch S2 which, when vibrated, alternately connects a small resistor R2 and a small capacitor C2 in parallel with coupling capacitor C1 and in series with a discharge circuit which is marked 5. Resistor R2 may have a value of about 100 ohms and is included to limit current during the initial instant of charging and discharging capacitor C2.

Reed 6 of magnetic reed switch S2 may be vibrated electromagnetically with an electromagnetic pulse generator that will be described in more detail later.

Figure 4:
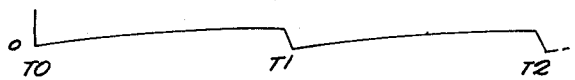
Figure 5:
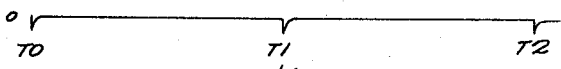
Figure 6:
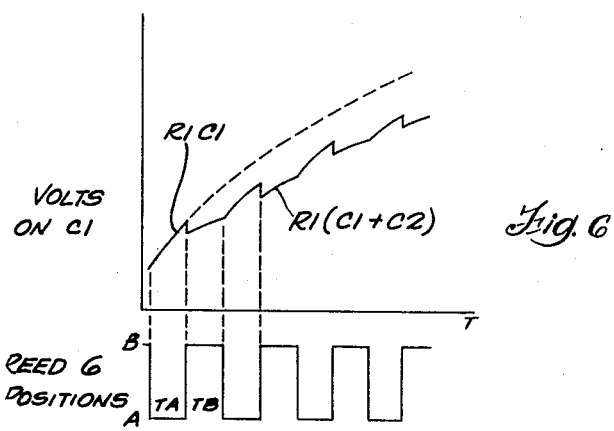

During threshold analysis, the reed switch is vibrated and capacitor C2 is caused to transfer increments of charge from coupling capacitor C1 and discharge these increments through discharge circuit 5. The amount of charge transferred during a given time period will, of course, depend on the rate at which the reed switch is vibrated. Thus, during the charging cycle of capacitor C1, the reed switch is constantly removing charge from it by means of capacitor C2. The result is that a lower and lower voltage will exist on capacitor C1 as the reed switch rate is increased. With any given rate of reed switch vibration, a certain final voltage will exist on capacitor C1 so that when switch S1 is closed, less current and less energy will be available for stimulating the heart. This is exemplified in FIG. 4 which assumes that the reed switch is vibrating at a constant rate and shows that the final voltage appearing on capacitor C1 at time T1 is less than the voltage existing at a corresponding time in FIG. 2 when the reed switch is not vibrating. In FIG. 5, one may see that correspondingly smaller negative stimulating pulses are applied to the heart when semiconductor switch S1 becomes conductive. During threshold analysis when coupling capacitor C1 is having increments of charge transferred from it, the charging curve between T0 and T1 is not smooth as in FIG. 4. In reality, the charging curve is step-like as shown in the magnified view in FIG. 6.

During threshold analysis, the vibrational rate of reed switch S2 is gradually increased until the energy delivered to the heart from coupling capacitor C1 is insufficient to stimulate the heart. This results in missed beats as indicated on an electrocardiograph. After it is certain that threshold has been reached as evidenced by a few consecutive missed beats, threshold analysis is terminated.

FIG. 1 also shows that embodied in the stimulator is an inductance coil L1 which is bridged by a couple of inversely connected diodes D1 and D2 that act as clippers and stray frequency suppressors. Inductor L1 is also adapted to receive magnetic pulses from an external pulse generator and inductor. When external pulses are applied to inductor L1 at a rate that is higher than the basic pulse rate of the stimulator, the higher rate predominates and the basic rate increases. Thus, the basic rate may be increased for the purpose of threshold analysis as will be described later and when the patient wants to set his heart rate for increased physical activity. The output energy is slightly reduced when the rate is increased externally. The concept of increasing the pulse rate of a remotely situated stimulator is described more fully in U.S. Pat. No. 3,185,940 in the name of Abbott, et al. and assigned to the assignee of the instant invention.

FIG. 7 shows another type of stimulator with which the new threshold analyzer system may be used. This stimulator is adapted to deliver to the heart stimuli that are alternately positive and negative. With this type of stimulator, only the negative going pulses to the heart are reduced during threshold analysis and only the beats corresponding with occurrence of negative pulses are missed when threshold is reached. A more complete description of this type of stimulator may be found in the copending application of one of the present inventors, Ser. No. 713,-110, filed Mar. 14, 1968, which is assigned to the same assignee as is the instant invention.

In FIG. 7, items that correspond with those in FIG. 1 are given the same reference numerals. The stimulator comprises a battery E1 which supplies a timing pulse generator 7. Pulse generator 7 produces output pulses at the same rate as the stimulating pulses that are applied to the heart. Each pulse from the generator switches a bi-stable multivibrator 8. The output stage of the multivibrator has a transistor, not shown, which is operating in saturation normally. Pulses from generator 7 switch the transistor from a saturated state to a nonconducting state in which case an essentially square wave output 9 occurs on its output line 10. Each rise and fall of the square wave corresponds with occurrence of a stimulating pulse to the heart. The voltage on line 10 swings from a high positive value to a more negative value upon receipt of a pulse from generator 7 and it swings back to a more positive value when the next pulse is received from generator 7.

When line 10 is negative, a capacitor C4 charges through the emitter-to-base circuits of cascaded switching transistors Q1 and Q2 and a resistor R4. The pulse of emitter current through Q1 and Q2 causes a corresponding pulse of collector current through the two transistors. This causes coupling capacitor C1 to charge rapidly and apply a stimulating pulse to the heart load. Transistors Q1 and Q2 then cut off. It is essential that the time constant of R4 and C4 be long enough to hold Q1 and Q2 conducting until coupling capacitor C1 is charged to the full battery voltage minus the voltage drop in transistors Q1 and Q2 and the other conductors in the C1 charging circuit.

When line 10 switches positive and coupling capacitor C1 is fully charged, and transistors Q1 and Q2 are cut off, capacitor C4 discharges through a diode D3 during the interpulse period. During the same time, another capacitor C5 is charging through the base-to-emitter circuits of transistors Q3 and Q4 and a resistor R5. When line 10 changes abruptly to its positive value, capacitor C5 induces a sharp current pulse through the base and emitter circuits of Q3 and Q4 in which case their collector circuits conduct for an instant during which coupling capacitor C1 is discharged. During the discharge interval of C1, a negative going stimulating pulse is applied to the heart load. When line 10 switches back to have voltage potential, capacitor C5 begins discharging through resistor R5 and a diode D4 which repeats the described cycle.

The stimulator in FIG. 7, like the stimulator in FIG. 1, is provided with a reed switch S2 that includes a magnetically vibratable reed for transferring increments of charge from coupling capacitor C1 by way of a small capacitor C2. In this circuit, when transistor Q1 becomes conductive to charge coupling capacitor C1, capacitor C2 immediately begins effecting charge transfer from the coupling capacitor C1. When the other transistor Q4 is made conductive, coupling capacitor C1 discharges to a low voltage level delivering a negative stimulating pulse to the heart.

Voltage conditions existing in the absence of threshold analysis are illustrated in FIGS. 8 and 9. In FIG. 8, it is seen that at time T0, coupling capacitor C1 is charged, delivering a stimulating pulse to the heart, and maintains its charge between heart beats until time T1 when the coupling capacitor discharges its full voltage and energy to the heart. There is then a period between T1 and T2 when coupling capacitor C1 remains discharged. This process is repeated to T3 and so on. FIG. 9 shows that when coupling capacitor C1 charges at T0, a positive stimulating pulse is imparted to the heart. When the capacitor discharges at T1, a negative pulse is imparted to the heart at a time that is separated from the first pulse by an interval that is designated TP, the basic stimulating interval.

FIGS. 10 and 11 show conditions existing during threshold analysis. When capacitor C1 charges at T0 in FIG. 10, it is seen that full voltage exists on the capacitor at this time. Because of the reed switch vibrating, however, the voltage on coupling capacitor C1 declines in steps relating to the reed switch frequency during the interpulse interval to a lower value at T1. Thus, it is seen in FIG. 11 that at T0 a full positive stimulating pulse is applied to the heart and at time T1 a negative stimulating pulse of lower value is applied. As shown in FIG. 11, this process repeats with all positive pulses being at their full value and the altenate negative pulses being diminished in amplitude depending on the rate at which the magnetic reed switch S2 is vibrated. As in the former case, the cyclic rate of the reed switch is increased during threshold analysis until the negative pulses conducted through the heart are insufficiently energetic to stimulate it in which case the heart commences to miss every other beat correspondingly with occurrence of the negative pulses.

It will be observed that during threshold analysis in connection with the stimulator shown in FIG. 1, when the reed switch is being vibrated, increments of charge are transferred by means of capacitor C2 from coupling capacitor C1 when the latter is both charging and discharging. The charge and energy existing on capacitor C1 may be fairly represented by the charging curve shown in FIG. 6 which is a magnified view of the charging curve between T0 and T1 in FIG. 1 during threshold analysis. When reed 6 of reed switch S2 is on the A contact, coupling capacitor C1 begins charging on its own time constant curve R1C1. When the reed is on contact B, capacitors C1 and C2 charge together. When the reed goes back to A contact, it discharges the increment of charge so that when it returns again to the B contact, a lower voltage is found to exist on capacitor C1. The net effect is that during the period between pacing pulses, capacitor C1 does not reach its normal charge level.

With the stimulator shown in FIG. 7 one need not be concerned about the charging curve of coupling capacitor C1 during threshold analysis because the coupling capacitor C1 charges during a time that is short as compared with the vibrational period of the reed switch. During the time between positive and negative pacing pulses, that is, between T0 and T1 in FIGS. 10 and 11 for example, the voltage on coupling capacitor C1 is reduced in increments to a level that it will have when coupling capacitor C1 is discharged as a result of transistor Q4 becoming conductive. The discharge curve of capacitor C1 is not actually smooth as it appears in FIG. 10, but is reduced in incremental steps as it appears in the magnified view in FIG. 16. In practical embodiments of the invention, wherein coupling capacitor C1 has a value of 3.3 microfarads as stated, small capacitor C2 has a value of 0.33 microfarad and the reed switch is operated in a manner that causes reed 6 to dwell for equal time periods on contacts A and B. It may be noted that the time spent by reed 6 in position A can be greater than in position B and B can be greater than A assuming C1 is greater than C2 and C2 can fully charge in position B and completely discharge in position A. The device should be designed so that the reed switch need not be vibrated at a rate much greater than 150 times per second which is well under the 200 hertz allowable with presently available reed switches. In advance of adapting a stimulator to threshold analysis by means of the invention, one may resort to a computer for determining the relationships between reed switch vibrational rate and the voltage and energy remaining on coupling capacitor C1 during threshold analysis. It is also easy to verify these relationships by connecting a resistor R2, a capacitor C2, and a reed switch to an existing stimulator while it is connected to a simulated heart load and while a variable pulse rate magnetic field is being applied to the reed switch.

It should be noted that if reed switch S2 fails by having its reed 6 lock onto contact B, that the stimulus pulse to the heart will be affected in a very minor way due to the small capacitance of C2 being added to the capacitance of coupling capacitor C1 as long as C1 is greater than C2. If reed 6 locks on contact A, there will be no effect on normal operation of the stimulator, because capacitor C2 won't charge, although threshold analysis would be impossible. Due to the design of the single pole, double-throw reed switch, it is unlikely to exhibit a failure condition when A is shorted to B. If reed 6 failed to make contact with either contact A or B, normal pacing stimuli would not be changed, but again, threshold analysis would be impossible. In no case of failure is the patient's stimulator adversely affected.

During threshold analysis, after the reed switch completes a given number of switching cycles, the voltage on coupling capacitor C1 minus a small drop appearing across the semiconductor switches will be the voltage applied across the heart load when either switch S1 in FIG. 1 or transistor switch Q4 in FIG. 7 become conductive. The voltage drop across the heart may be expressed in terms of energy by use of the well-known equation, energy $W = \frac{1}{2}CV^2$. The load voltage and energy can be related back to the number of reed switching cycles. The number of cycles that occur at a given setting of the threshold analyzer magnetic pulse generator is controlled by the basic stimulating pulse period and the reed switch. The number of cycles occurring between basic pacing pulses equals the product of the time between pulses TP and the vibrational frequency of the reed switch. This product must remain constant for each energy control setting. The variable that is most readily controllable externally of the implanted stimulator is the vibrational frequency of the reed switch. In other words, the pace pulse period TP affects the number of cycles of the reed switch and must be considered in calibrating the external magnetic pulse generator in terms of stimulus energy. This may be appreciated by examining FIG. 12. If positive and negative pacing pulses occur at T0 and T1, respectively, the time between pacing pulses may be represented by TP1. If each of the marks 15 represent a complete cycle of the reed switch, it will be seen that a given number of cycles will occur during the TP1 interval. Now, if as in FIG. 13, the basic pulse period is extended over the interval TP2, stimulating pulses will occur at T0' and T1' and will be positive and negative, respectively. If the reed switch were operated at the same frequency as in FIG. 12, about twice as many reed switch vibration cycles 15 would occur between T0' and T1' thus reducing the final voltage on coupling capacitor C1 and upsetting the calibrated relationship between energy to the heart and vibrational frequency of the reed switch. Consequently, when the basic pulse period TP2 is twice that of TP1, for example, the number of reed switching cycles 15 must be cut in half so that the product of the stimulus pulse period and the number of reed switch cycles remains constant for a given energy output.

There are a number of methods for maintaining this constancy. A preferred method will now be described in reference to FIG. 14. In FIG. 14, the broken line 16 represents the surface of the patient's body. Beneath the surface, a stimulator pulse generator and power supply is implanted. Through a fluid-tight connector 17, flexible insulated conductors extend to the heart 18 and their uninsulated ends are sutured in the heart tissue with a space between them constituting an essentially resistive heart load. Magnetic reed switch S2 is shown in dotted line in stimulator 1. During threshold analysis, a rotating magnet 19 which may be embedded in a disk, not shown, is held over the site of implantation of the stimulator. A motor 20 rotates the disk and its rotational speed is variably controlled through the agency of a motor speed control 23. Reed switch S2 is caused to execute a complete switching cycle, that is, from contact A to B and back again to A each time either a north or south pole of the magnet passes over the reed switch S2. This is the manner in which external magnetic pulses are caused to operate the reed switch S2 during threshold analysis. A pulsing electromagnetic field of sufficient strength to operate reed switches S2 and S3 can replace the rotating magnet, motor and speed control. The pulses to an electromagnet placed near the reed switch will be controlled in pulsing rate by an electronic timing circuit. High frequencies are shunted from this electromagnet operation so it will not affect stimulator pacing rate.

Mounted on a frame, not shown, that supports the motor 20 and holds the magnet 19 in spaced relationship with the patient's skin surface is another magnetic reed switch S3. Reed switch S3 is also caused to open and close each time either a north or south pole of the magnet passes under it. Thus, reed switch S2 in the stimulator and reed switch S3 externally of the patient operate in synchronism as magnet 19 is rotated.

Reed switch S3 is in series with a battery E2 and a resistor R5. Each closure of reed switch S3 therefore, causes a voltage pulse across R5. These pulses are counted in an electronic counter 21 which, in the last analysis, counts the number of switching cycles executed by reed switch S2.

As stated earlier, the product of the pacing pulse period and the vibrational frequency of the reed switch S2 must equal a constant value for each energy setting during threshold analysis. A convenient way of doing this is to resort to the use of an external rate control 22 which, as was mentioned earlier, is described in U.S. Pat. No. 3,185,940. The external rate control 22 is adapted to be adjusted to produce electric pulses at a rate which is greater than the basic stimulating pulse rate of the implanted stimulator. For example, the external rate control may be adjusted to pulse at eighty pulses per minute which is in excess of the customary basic pulse rate of seventy pulses per minute for the stimulator 1. These electric pulses are supplied to an induction coil L2 which is also placed on the surface 16 of the patient's body during threshold analysis. Pulses from coil L2 causes pulses to be induced in inductor L1 in the stimulator and these cause the stimulator to conduct at an earlier instant, thereby increasing the stimulating pulse rate. The output signals from the external rate control 22 are also supplied to the electronic counter 21 for gating it or turning it on coincidentally with the occurrence of the prefiring pulse that is induced in inductor L1. Thus, the electronic counter 21 turns on when one stimulating pulse occurs and turns off for the next stimulating pulse, therefore, counting the number of reed switch vibrations between stimulating pulses. The gate will repeat the cycle starting on the next pulse. The gate may be eliminated if the basic pace pulse rate is determined and the counter 21 is set to count only during a period that corresponds with the time between pace pulses. Then the number of reed switch operations per pace pulse period will be held constant for a given energy on the coupling capacitor.

The number of reed switch S2 cycles per pacing pulse is digital information that is represented by output pulse signals from the electronic counter 21. The digital signals may be used directly as an indication of threshold or as in this example, the signals may be fed into a digital-to-analog converter 24 where they are converted to an analog voltage whose magnitude is representative of the number of counts. The analog voltage operates a meter 25 which is calibrated in terms of the percentage of available energy from the stimulator that is required to stimulate the heart.

FIG. 15 is a graph showing the relationship between percent of available energy and reed switch cycles per pacing pulse. Since during threshold analysis, in the illustrative embodiment of the invention, the pacing rate of the heart is held constant at eighty pulses per minute, it is only the number of reed switch cycles that is varied. Hence, the number of reed switch cycles per pace pulse can be directly related to the amount of energy on coupling capacitor C1.

To summarize, determining the threshold energy of the heart stimulation with the new threshold analyzer involves connecting the patient to an electrocardiograph, not shown. The inductor L2 is mounted on a frame work, not shown, that encircles rotating magnet 19 and these two elements are placed over the implanted stimulator 1. The external rate control 22 is turned on and adjusted until the electrocardiograph indicates that the patient is being paced at eighty pulses per minute or the rate control may have a scale to indicate eighty pulses per minute. Motor speed control 23 is adjusted to cause motor 20 to rotate at its lowest speed such as five revolutions per second although motor speed need not be known. This causes reed switch S2 in the stimulator to operate at twice the rotational speed of the motor. The pulses from the external rate control 22 then gate the electronic counter 21 to count the number of reed switch vibrations between pacing pulses. This digital information is converted to analog voltage which is read out on meter 25.

During the process, the speed of motor 20 is gradually increased until the electrocardiograph indicates about three missed heart beats in succession. It will be remembered that with the stimulator shown in FIG. 7, only alternate beats will be missed. When this occurs, it is indicative that the energy being supplied to the heart is below the threshold level of stimulation. If the energy required for stimulation is a large percentage of the energy available from the stimulator, battery depletion, high impedance in the stimulator circuitry or physiological reasons for the heart failing to respond to stimulation may be indicated. This threshold analysis is the analysis of the complete stimulator system including the generator, heart response, connecting leads, heart attachment, etc. Actual or prospective battery depletion is most commonly the problem. Since the stimulator power supply is implanted subcutaneously in tissue remote from the heart and is connected to the heart by leads, the stimulator may be removed under local anesthetic and another one attached to the lead to restore the patient to normal pacing with little delay.

Although the new threshold analyzer has been described as using a bar magnet to actuate the implanted reed switch for transferring increments of charge during threshold analysis, it should be understood that a magnetic field from other sources may be substituted for the magnet.

In a dual rate stimulator such as is shown in Pat. No. 3,311,111 in which there is another reed switch for changing rate, one of the reed switches may be operated in a polarized manner so that the magnetic field is selective of which reed switch will operate during threshold analysis. Generally, however, it is immaterial that the rate changing reed switch is operated during threshold analysis since this reed switch will just change the time constant of the pace timing circuit to some value intermediate the high and low pacing rates. However, as is evident from the description above, once the basic pacing rate is captured and increased by the external rate control 22 during threshold analysis, it does not make any difference if the dual-rate reed switch is operated at a lower rate because it is in the timing circuit and has no effect on the charge or discharge time of coupling capacitor C1.

It is also contemplated that a semiconductor switch may be substituted for reed switch S2 to transfer increments of charge to or from coupling capacitor C1 by way of small capacitor C2. Using a semiconductor switch S2 requires another induction device to trigger it, but this can be devised readily by one skilled in the electronic arts. An induction coil with a series rectifier and a capacitor for building up a voltage to forward bias a transistor switch exemplifies one solution. In any case, attention should be given to choosing controls for the switches, whether they be magnetic or electromagnetic, which permit independence or other control functions unless the need for independence is otherwise obviated.

The charge transferring capacitor C2 may, in certain models, be almost as large as coupling capacitor C1, for instance, one-third to one-half as large in which case low frequency threshold analysis could still be conducted. Then when a patient's heart fails to respond to the energy from C1 alone, as happens in some cases, the patient could place a permanent magnet over the reed switch and cause C2 to remain parallel with C1 in which case higher energy pulses would be delivered to the heart to sustain the patient until a higher energy stimulator is substituted.

What is claimed is:

1. An implantable heart stimulator that is adapted for remote assessment of the heart's threshold energy for stimulation comprising:
   (a) an electric power source,
   (b) a coupling capacitor through which a heart to be stimulated may be connected in a series circuit which includes the power source and which enables the coupling capacitor to be charged, (c) a charge transferring capacitor which has a capacitance of a substantially smaller value than the coupling capacitor and which has one side connected in a circuit with one side of the coupling capacitor, (d) a discharge circuit for said charge transferring capacitor, (e) a remotely operable switch means in said stimulator, the switch means connecting the charge transferring capacitor in parallel with said coupling capacitor to accept charge therefrom and alternately connecting the charge transferring capacitor to said discharge circuit, (f) a first semiconductor switch means connected in series with said coupling capacitor and with a circuit that may include the heart, (g) a timing device adapted to render said first semiconductor switch means conductive periodically to discharge said coupling capacitor and stimulate the heart with pulses of electric energy whose magnitude depends on the rate at which the remotely operable switch means is operated, whereby said energy may be reduced on the coupling capacitor until it reaches the threshold energy of stimulation of the heart.

2. The invention set forth in claim 1 including:

(a) a second semiconductor switch means that is connected in a series circuit with the first semiconductor switch means, which series circuit is connected to the power source, (b) the said coupling capacitor having its said one side connected to a point intermediate said first and second semiconductor switch means, (c) the said timing device being adapted to render said second semiconductor switch means conductive to charge said coupling capacitor and thereby stimulate a connected heart periodically with a pulse having a predetermined polarity while said first semiconductor switch means is rendered nonconductive by said timing device.

3. The invention set forth in claim 1 wherein:

(a) said remotely operable switch means is a single pole, double-throw magnetic reed switch.

4. The invention set forth in claim 2 wherein:

(a) said remotely operable switch means is a single pole, double-throw magnetic reed switch.

5. An analyzer system for assessing from outside of the body the threshold energy of stimulation of a heart that is stimulated by an implanted stimulator which is provided with a remotely operable switch for transferring increments of charge from a heart coupling capacitor through the agency of a relatively small capacitor and a discharge circuit, comprising:

(a) a variable external source of control pulses that may be coupled with said remotely operable switch to effect transfer of increments of charge, (b) a switch means that is external to the body and also operated by the external control source, (c) electronic counter means adapted to produce output signals corresponding with operation of the external switch means, (d) an external rate control means which produces electric pulses at a selectable rate that corresponds with the desired repetition rate of stimulating pulses for the heart during threshold analysis, (e) an external induction coil being supplied with pulses from said external rate control means and for inducing control pulses in the stimulator which establish the stimuli repetition rate, (f) said counter also being adapted to turn on coincidentally with occurrence of a stimulating pulse and to turn off when the next stimulating pulse occurs so that the counter means counts the number of cycles of the remotely operable switch means between stimulating pulses, whereby the number of switching cycles between stimulating pulses when the heart fails to respond to stimuli is indicative of that proportion of energy that is available from the stimulator which is required to stimulate the heart.

6. The invention set forth in claim 5 including:

(a) a digital-to-analog converter connected to receive the digital output signals from the counter means and adapted to convert the same to an analog signal that is a function of the number of counts, and (b) a meter that indicates the analog signal level in terms of the percent of available energy required to stimulate the heart at a time when the remotely operable switch is operated at a rate that reduces the energy of the pacing pulses through the coupling capacitor until the threshold level of stimulation of the heart is attained.

7. The invention set forth in claim 5 wherein:

(a) said counter means is connected to said external rate control for receiving a gating signal from the rate control to turn the counter means on and off upon occurrence of stimulating pulses, respectively.

References Cited

UNITED STATES PATENTS

| | | | |
|---|---|---|---|
| 3,195,540 | 7/1965 | Waller | 128—422 |
| 3,241,556 | 3/1966 | Zacouto | 128—421 |
| 3,311,111 | 3/1967 | Bowers | 128—422 |
| 3,426,748 | 2/1969 | Bowers | 128—2.06 |

FOREIGN PATENTS 1,444,363  3/1966  France.

OTHER REFERENCES

Davies, Journal of British Institute of Radio Engineers, vol. 24, No. 6, December 1962, pp. 453–456.

WILLIAM E. KAMM, Primary Examiner

U.S. Cl. X.R.

128—421; 324—103